(12) United States Patent
Wang et al.

(10) Patent No.: US 8,515,283 B2
(45) Date of Patent: Aug. 20, 2013

(54) TRANSPARENT FIBER CHANNEL LINK MANAGEMENT FOR PROTOCOL TRANSPORT

(75) Inventors: Zengyuan Wang, San Jose, CA (US); Tuchih Tsai, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 13/118,851

(22) Filed: May 31, 2011

(65) Prior Publication Data

US 2011/0229139 A1 Sep. 22, 2011

Related U.S. Application Data

(62) Division of application No. 11/457,070, filed on Jul. 12, 2006, now Pat. No. 7,965,940.

(51) Int. Cl.
*H04J 14/02* (2006.01)

(52) U.S. Cl.
USPC .................................. 398/79; 398/25; 398/31

(58) Field of Classification Search
USPC .......................... 398/25, 31, 45–46, 51, 54, 79
See application file for complete search history.

(56) References Cited

U.S. PATENT DOCUMENTS

| | | | |
|---|---|---|---|
| 6,624,770 B1 * | 9/2003 | Tsai et al. | 341/102 |
| 6,978,457 B1 | 12/2005 | Johl et al. | |
| 7,042,842 B2 * | 5/2006 | Paul et al. | 370/229 |
| 7,187,650 B2 * | 3/2007 | Xiong et al. | 370/235 |
| 7,385,982 B2 * | 6/2008 | Warden et al. | 370/392 |
| 7,474,613 B2 * | 1/2009 | Bergamasco et al. | 370/229 |
| 2009/0190466 A1 * | 7/2009 | Girardi et al. | 370/216 |

\* cited by examiner

*Primary Examiner* — Dzung Tran
(74) *Attorney, Agent, or Firm* — P. Su

(57) ABSTRACT

Methods and apparatus for providing distance extension and other transport functions such as error monitoring, provisioning, and link/service management in a fiber channel path are disclosed. According to one aspect of the present invention, a transport node includes a processing arrangement and an output interface. The processing arrangement creates a first ordered set that includes information associated with an ability for the transport node to receive a first fiber channel frame, and inserts the first ordered set between a second ordered set and a third ordered set of a fiber channel stream. The output interface transmits the fiber channel stream, which includes the information regarding whether the transport node is capable of receiving the first fiber channel frame.

5 Claims, 7 Drawing Sheets

TRANSPARENT FIBER CHANNEL LINK MANAGEMENT FOR PROTOCOL TRANSPORT

BACKGROUND OF THE INVENTION

1. Field of Invention

The present invention relates generally to fiber channel communications over dense wave division multiplexing (DWDM) networks. More particularly, the present invention relates to a system which enables distance extension, as well as other transport functions, to be efficiently achieved between a pair of fiber channel switches or nodes.

2. Description of the Related Art

Fiber channel is a protocol that is used extensively for storage networking, and allows data to be transmitted between computing systems at data rates of up to approximately ten Gigabits per second (Gbps). As will be appreciated by those skilled in the art, fiber channel uses a Gigabit Ethernet physical layer for transmission.

Fiber channel capabilities are typically such that between two fiber channel switches or nodes coupled to storage systems, a transmission distance of up to approximately ten kilometers may be achieved without compromising data throughput. As the use of networks increases, however, transmission distances that are significantly greater than ten kilometers are often desired, particularly when a storage network is used to mirror data geographical locations. By way of example, transmission distances of between approximately 500 kilometers and approximately 1000 kilometers may be needed in storage networks which utilize fiber channel devices.

To achieve transmission distances that exceed the approximately ten kilometer transmission distances that are generally possible between two fiber channel nodes, distance extension techniques may be implemented. Incorporating fiber channel transport nodes with storage capabilities into a path between two fiber channel nodes, e.g., switches, provides the capability to achieve full data throughput over an extended distance.

Fiber channel transport nodes such as fiber channel transport linecards may be included in a path between fiber channel switches to provide distance extension. Such fiber channel transport linecards may include buffers to temporarily store fiber channel frames that are to be transported between two fiber channel clients. In order to establish flow control between two fiber channel transport linecards, buffer-to-buffer credit thresholds are effectively determined for each fiber channel transport linecard. A buffer-to-buffer credit threshold is an indicator of the total number of credits associated with the fiber channel device, or a substantially maximum number of frames a fiber channel transmit linecard may accept for storage and transmission without acknowledgement from receiver. The number of buffer-to-buffer credits associated with a fiber channel devices is dependent upon the distance over which the fiber channel device is expected to transmit frames. Hence, for a given path length, the throughput for the path is a function of the number of buffer-to-buffer credits available for the fiber channel transport linecards in the path.

As bandwidth is generally expensive, in order for fiber channel transport linecards to efficiently use bandwidth in a path, the fiber channel transport linecards generally must be made aware of the number of buffer-to-buffer credits associated with other fiber channel linecards. By way of example, a first fiber channel transport linecard, or a local linecard, must be aware of how many buffer-to-buffer credits are associated with a second fiber channel transport linecard, or remote linecard, if the first fiber channel transport linecard is to efficiently use available bandwidth on a link between the first fiber channel transport linecard and the second fiber channel transport linecard.

When a fiber channel frame is to be sent from a first fiber channel transport linecard to a second fiber channel transport linecard, the first fiber channel transport linecard may encapsulate the first fiber channel frame such that the fiber channel frame may be carried on a different protocol. The different protocols may include Gigabit Ethernet protocols, and Synchronous Optical Network (SONET) protocols such as OC-48 and OC-192.

After encapsulating the fiber channel frame, the first fiber channel transport linecard adds link management information, e.g., information about the buffer-to-buffer credits associated with the first fiber channel transport linecard, to the encapsulated fiber channel frame. Once the link management information is added to the encapsulated fiber channel frame, the encapsulated fiber channel frame is sent to the second fiber channel transport linecard which may then utilize the link management information.

Although the use of encapsulated fiber channel frames with link management information allows the link management information to be propagated from one fiber channel transport linecard to another, the encapsulation process is often complex and time consuming. Extra hardware resources may be necessary for encapsulation, thereby adding costs to an overall system. Further, the transmission of encapsulated fiber channel frames utilizes significant bandwidth, which is expensive, and is not protocol independent or scaleable.

Therefore, what is needed is an efficient method for providing distance extension for a fiber channel path. That is, what is desired is an efficient system which allows management information to be communicated between fiber channel transport linecards used for distance extension purposes without utilizing additional bandwidth.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Management messages may be transmitted using fiber channel communications between transport nodes such as fiber channel transport linecards by replacing idle ordered sets that are typically transmitted between fiber channel frames with ordered sets which contain link management information. The use of management messages allows efficient distance extension to be achieved, for example, without requiring additional bandwidth and without introducing added complexity within a system. Management messages may also be used for other purposes including, but not limited to, error monitoring, provisioning, and link/service management. Further, storage devices and fiber channel switches, i.e., fiber channel clients, may operate without being aware that fiber channel transport linecards exchange management messages. In other words, management messages may be exchanged substantially transparently from the point-of-view of fiber channel clients.

Figure 1A:
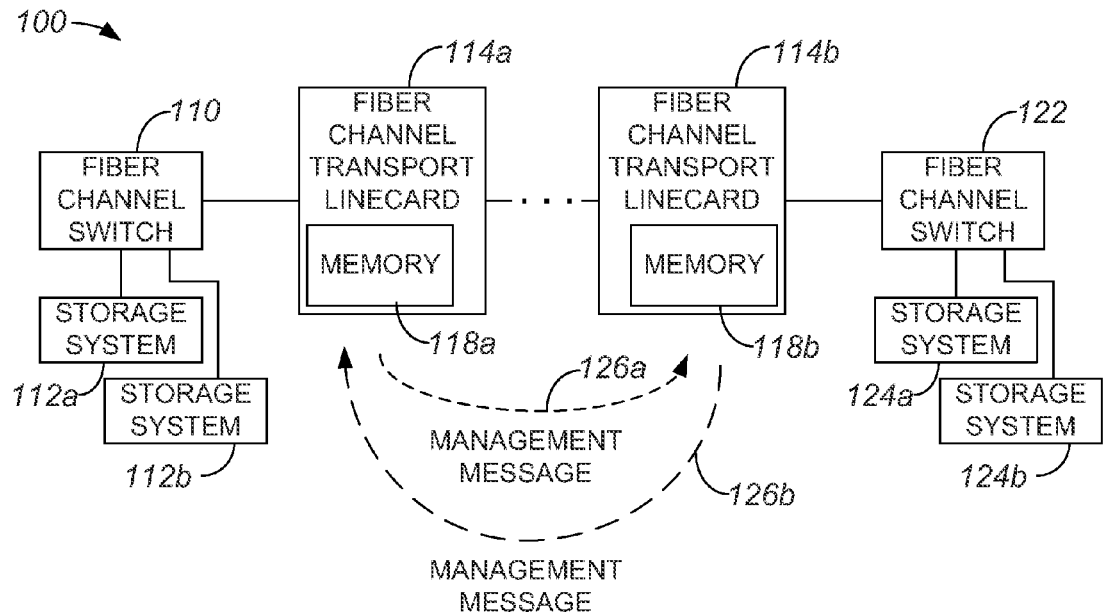
FIG. 1A is a block diagram representation of a network in which management messages are passed between fiber channel transport linecards in accordance with an embodiment of the present invention.

FIG. 1A is a block diagram representation of a network in which management messages are passed between transport nodes in accordance with an embodiment of the present invention. A storage area network 100, which may be an overall dense wave division multiplexing (DWDM) system such as synchronous optical network (SONET) or a synchronous digital hierarchy (SDH) network, includes fiber channel switches 110, 122 which are in communication over a path that uses transport nodes 114a, 114b for the purposes of distance extension. Storage systems 112a, 112b are coupled to fiber channel switch 110, while storage systems 124a, 124a are coupled to fiber channel switch 122. Transport nodes 114a, 114b may be fiber channel linecards. In one embodiment, fiber channel linecards 114a, 114b accommodate multi-rate and multi-protocol inputs including, but not limited to, fiber channel, 2× fiber channel, 4× fiber channel, and gigabit Ethernet. Fiber channel transport linecards 114a, 114b may function as aggregators to encapsulate traffic into generic framing procedure-transparent packets, and as transponders to pass traffic from ingress to a DWDM trunk. The use of fiber channel transport linecards 114a, 114b allows a transmission distance between fiber channel switches 110, 122 to be extended, e.g., to greater than approximately ten kilometers. In one embodiment, fiber channel transport linecards 114a, 114b may cooperate to allow fiber channel switches 110, 122 to communicate over between approximately 500 kilometers and approximately 1000 kilometers.

Fiber channel transport linecards 114a, 114b each include a memory 118a, 118b, respectively. Memory 118a and memory 118b are arranged to serve as buffers to temporarily store transmissions intended for fiber channel switch 110 and fiber channel switch 122. Specifically, memory 118a may store a fiber channel frame intended for fiber channel switch 110 or for fiber channel switch 112 via fiber channel transport linecard 114b, while memory 118b may store a fiber channel frame intended for fiber channel switch 112 of fiber channel switch 110 via fiber channel transport linecard 114a. Although two fiber channel transport linecards 114a, 114b are shown, it should be appreciated that a path between fiber channel switch 110 and fiber channel switch 122 may generally include any number of transport nodes or fiber channel transport linecards.

Fiber channel transport linecards 114a, 114b utilize a credit-based flow control mechanism to effectively control the flow of data therebetween. Credit, e.g., buffer-to-buffer credit, is effectively associated with each fiber channel transport linecard 114a, 114b. In one embodiment, credits may be associated with fiber channel switches 110, 122, but fiber channel transport linecards 114a, 114b are arranged to cause each fiber channel switch 110, 112 to believe that the other fiber channel switch 110, 112 has available capacity to receive data. To facilitate the efficient communication of information pertaining to buffer-to-buffer credit without requiring additional bandwidth, management messages 126a, 126b may be sent between fiber channel transport linecards 114a, 114b to communicate the information pertaining to credit. For example, fiber channel transport linecard 114a may send information to fiber channel transport linecard 114b that indicates how much credit is available with respect to fiber channel transport linecard 114a using management message 126a, while fiber channel transport linecard 114b may send information to fiber channel transport linecard 114a that indicates how much credit is available with respect to fiber channel transport linecard 114b using management message 126b. Fiber channel switches 110, 122 may generally be unaware of the transmission of management messages 126a, 126b, though the information relating to available credit is essentially information relating to the available credit associated with fiber channel switches 110, 122.

Typically, when fiber channel frames are sent by either a fiber channel switch or a fiber channel transport linecard, the frames are sent in fiber channel streams that include ordered sets. In general, fiber channel frames are transmitted with at least six ordered sets between consecutive fiber channel frames, as specified in a Fiber Channel—Framing and Signaling (FC-FS) standard, e.g., FC-FS INCITS 373-2003. It should be appreciated, however, that there may be some instances in which less than six ordered sets may be transmitted between consecutive fiber channel frames. The ordered sets have approximately 32 bits each, and, include a receive-ready ordered set as well as one or more idle ordered sets. A management message such as management messages 126a, 126b of FIG. 1A may be sent between fiber channel transport linecards 114a, 114b in place of idle ordered sets in fiber channel streams.

Figure 1B:
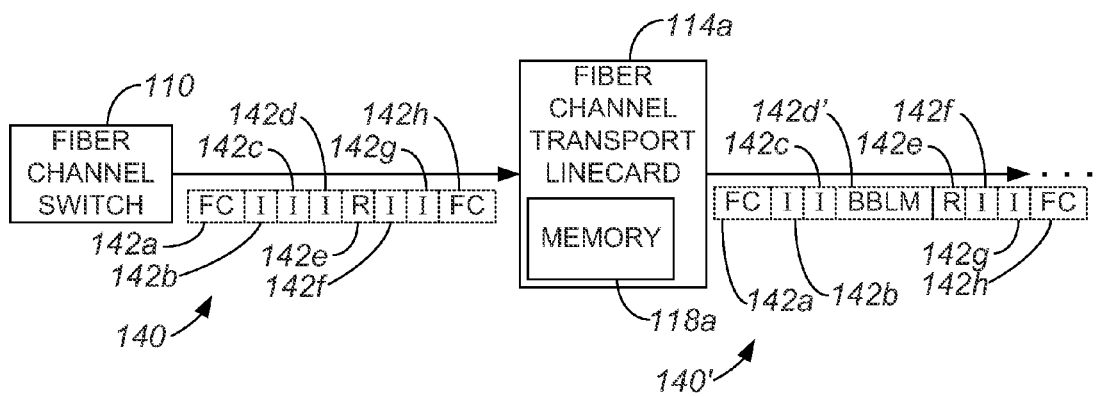
FIG. 1B is a block diagram representation of streams of frames and ordered sets being transmitted by a fiber channel switch and a fiber channel transport linecard, e.g., fiber channel switch 110 and fiber channel transport linecard 114a of FIG. 1B, in accordance with an embodiment of the present invention.

FIG. 1B is a block diagram representation of streams of frames and ordered sets being transmitted by a fiber channel switch and a fiber channel transport linecard, e.g., fiber channel switch 110 and fiber channel transport linecard 114a of FIG. 1B, in accordance with an embodiment of the present invention. When fiber channel switch 110 has fiber channel frames 142a, 142h to send to fiber channel transport linecard 114a, fiber channel switch 110 sends fiber channel frames 142a, 142h as a part of a fiber channel stream 140. Stream 140 includes at least six ordered sets 142b-g. Ordered sets 142b-g include idle ordered sets or idles 142b-d, 142f, 142g, and a receive-ready ordered set 142e.

When fiber channel transport linecard 114a receives fiber channel stream 140, fiber channel transport linecard 114a may determine that fiber channel frames 142a, 142h are to be forwarded through fiber channel transport linecard 114b to fiber channel switch 122 of FIG. 1A. In addition to forwarding fiber channel frames 142a, 142h, fiber channel transport linecard 114a creates and sends an ordered set which contains information pertaining to available credit, i.e., available buffer-to-buffer credit, with respect to fiber channel transport linecard 114a. The ordered set is a management ordered set that includes information that may be used to provide link control and management capabilities, e.g., to provide peer to peer fiber channel link management and buffer-to-buffer credit management functions. The management ordered set, in one embodiment, is a back bone link management (BBLM) ordered set 142d'.

When fiber channel transport linecard 114a sends a fiber channel stream 140' with fiber channel frame 142a and fiber channel frame 142h, BBLM ordered set 142d' is included. As shown, BBLM 142d' is transmitted substantially immediately preceding receive-ready ordered set 142e, although BBLM 142d' may generally be included anywhere in fiber channel stream 140' between fiber channel frame 142a and fiber channel frame 142h.

Figure 2A:
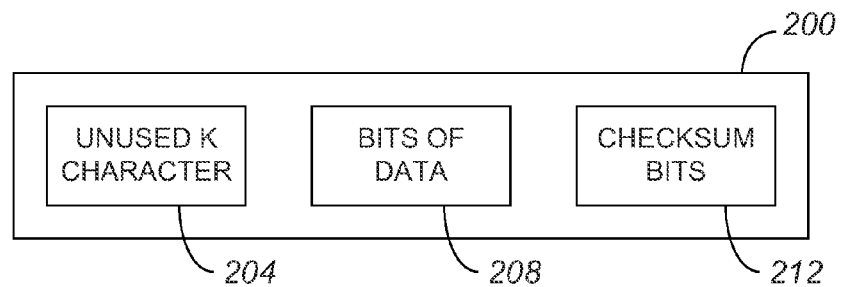
FIG. 2A is a block diagram representation of an ordered set which may be transmitted in place of an idle ordered set in accordance with an embodiment of the present invention.

A BBLM ordered set is one embodiment of a management ordered set that allows link control and management messages to be exchanged between two transport nodes, e.g., fiber channel transport linecards 114a and 114b of FIG. 1A. Referring next to FIG. 2A, an ordered set that may be used to propagate management information will be described in accordance with an embodiment of the resent invention. A management ordered set 200 may include approximately the same number of bits as an idle ordered set or substantially any other ordered set, e.g., approximately 32 bits. The bits in ordered set 200 may effectively be divided into bits associated with a K character 204, bits of data 208, and checksum bits 212. Bits of data 208 and checksum bits 212 generally form approximately 24 bits of application data. Bits of data 208, which may include approximately 16 bits, generally contains information that may be used by fiber channel linecards to perform link management functions.

Typically, idle ordered sets maybe identified by a K28.5 character. Hence, in order for ordered set 200 to be recognized as not being an idle ordered set ordered set, K character 204 is arranged to be a K character that is not associated with other ordered set types. In one embodiment, K character 204 may be a K26.5 character. It should be appreciated, however, the K character 204 may generally be any character which is otherwise not used and may be understood to indicate that ordered set 200 is not an idle ordered set. For example, the K character may be a K26.1 character, a K28.1 character, etc. or substantially any other unused approximately eight or ten bit K character that is not defined by fiber channel standards.

Figure 2B:
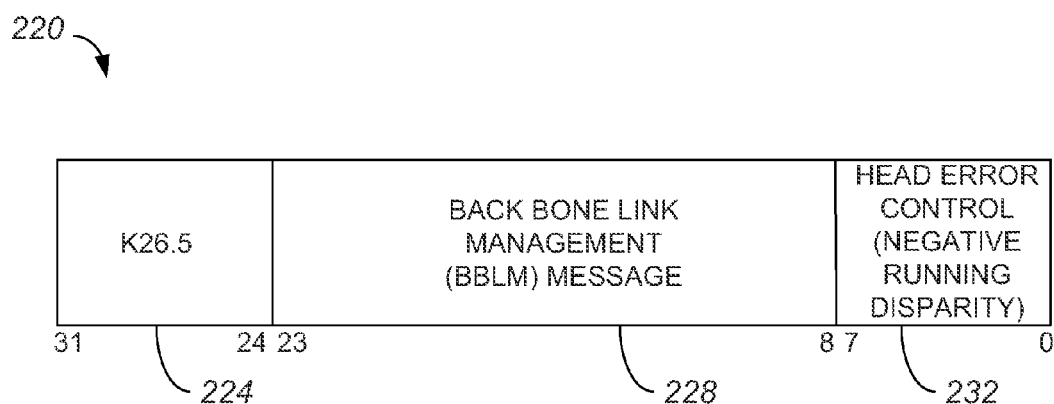
FIG. 2B is a block diagram representation of a back bone link management (BBLM) ordered set which includes a BBLM message in accordance with an embodiment of the present invention.

In one embodiment, a management ordered set may be a BBLM ordered set, as previously mentioned. FIG. 2B is a block diagram representation of a back bone link management (BBLM) ordered set which includes a BBLM message in accordance with an embodiment of the present invention. A BBLM ordered set 220 includes approximately 32 bits. BBLM ordered set 220 is identified by a particular K character 224 that is stored as approximately eight bits. As previously mentioned, K character 224 may be any character that is not used to identify other ordered sets. In the described embodiment, K character 224 is a K26.5 character. If K26.5 is predefined or otherwise known within a network as being arranged to identify BBLM ordered set 220, then each time K26.5 is identified in an ordered set, the ordered set may be processed as containing a BBLM message 228. That is, substantially any ordered set that includes K26.5 character 225 may be processed as including BBLM message 228.

BBLM message 228 is up to approximately sixteen bits that contains information that may be communicated between fiber channel transport linecards to provide link control and management information. The information contained in BBLM message 228 may vary widely. One embodiment of BBLM message 228 will be described below with respect to FIG. 2C.

Eight bits of BBLM ordered set 220 may be head error control bits 232. Head error control bits may be associated with an asynchronous transfer mode (ATM) to provide a cyclic redundancy check. In one embodiment, head error control bits 232 may be calculated based on a cyclic redundancy check polynomial to provide message protection.

Head error control bits 232 may include running disparity, e.g., negative running disparity, bits. As will be understood by those skilled in the art, a running disparity is a difference between the number of '1' bits and the number of '0' bits in a given character or bit stream. A negative running disparity, which generally indicates that there are more '0' bits than '1' bits, is specified by fiber channel standards as being at the end of an ordered set, and may be used for error detection.

Figure 2C:
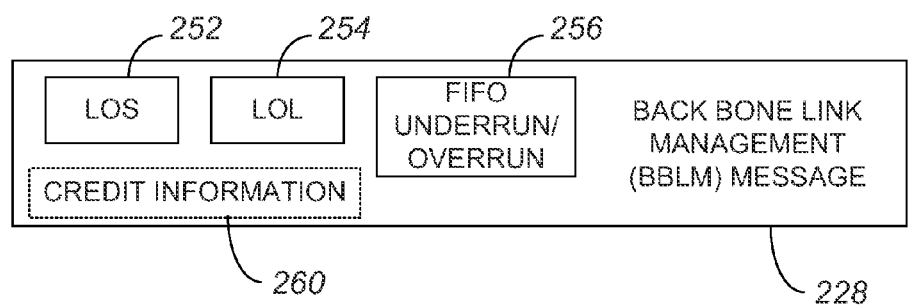
FIG. 2C is a block diagram representation of a BBLM message, i.e., BBLM message 228 of FIG. 2B, in accordance with an embodiment of the present invention.

With reference to FIG. 2C, a BBLM message, e.g., BBLM message 228 of FIG. 2B, will be described in accordance with an embodiment of the present invention. BBLM 228 may generally include information that is used by a fiber channel linecard for management purposes. The management purposes may include, but are not limited to, allowing a sender and a receiver of BBLM message 228 to effectively synchronize their memories or buffers, such that a link or links between the sender and the receiver are substantially always loaded. In general, BBLM message 228 may include a set of information that is used during a fiber channel login period and another set of information that is used during a data flow control period, i.e., after a login period. When used during a fiber channel login period, BBLM message 228 may be used to acquire the number of buffer-to-buffer credits associated with fiber channel nodes or switches, and to understand what type of flow control mode is negotiated between local and remote fiber channel nodes.

Information that may be included in BBLM message 228 includes credit information 260 that indicates how much credit is associated with a linecard that sends or initiates BBLM message 228. As previously mentioned, credit information 260 may indicate how many frames may be accepted by a linecard, and potentially stored in a memory or buffer of the linecard, for transmission. During a login period, credit information 260 may indicate a total amount of credit associated with a sender. During a data flow control period, credit information 260 may indicate an amount of credit available at the sender. Upon receiving credit information 260, a receiver may make adjustments to either send additional data or prevent additional data from being sent to the receiver.

Typically, information in BBLM message 228 includes status indicators associated with a sender. The status indicators may include a loss of signal (LOS) indicator 252, a loss of lock (LOL) indicator 254, and a first-in-first-out underrun or overrun indicator 256. Information may also include bits that are arranged to indicate a request for a connection (not shown) or bits that acknowledge a request (not shown) during a login or initialization period.

Figure 3A:
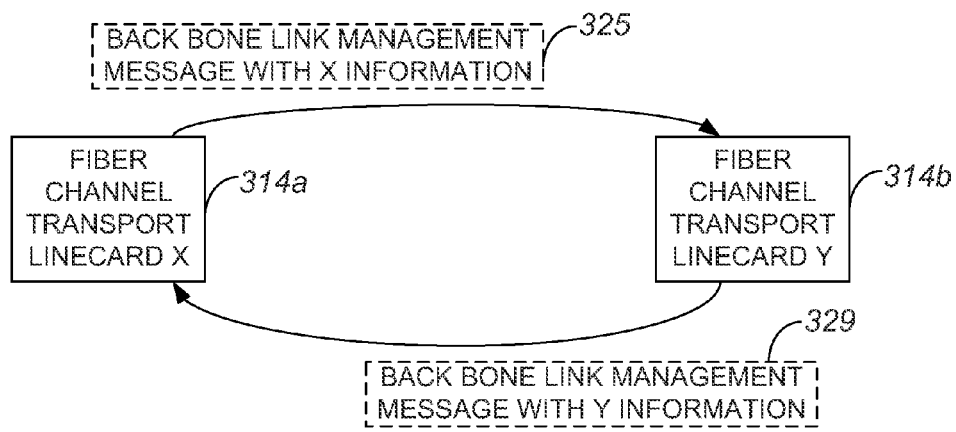
FIG. 3A is a diagrammatic representation of BBLM messages being sent between a plurality of fiber channel transport linecards in accordance with an embodiment of the present invention.

FIG. 3A is a diagrammatic representation of BBLM messages being sent between a plurality of fiber channel transport linecards in accordance with an embodiment of the present invention. A fiber channel transport linecard X 314a, which is in communication with fiber channel transport linecard Y 314b between fiber channel switches (not shown) is arranged to transmit a BBLM message 325 to fiber channel transport linecard Y 314b. BBLM message 325, which may be transmitted in place of an idle ordered set, include information associated with fiber channel transport linecard X 314. Upon receiving BBLM message 325, fiber channel transport linecard Y 314b may utilize the information contained in BBLM message 325 to provide transparent link control relative to sending data on a link to fiber channel transport linecard X 314b.

Similarly, fiber channel transport linecard Y 314b is arranged to send a BBLM message 329 to fiber channel transport linecard X 314a that contains information pertaining to fiber channel transport linecard Y 314b. Fiber channel transport linecard X 314a uses information in BBLM message 329, and fiber channel transport linecard Y 314b uses information in BBLM message 325, to provide distance extension by controlling the flow of information in both directions between fiber channel transport linecard X 314a and fiber channel transport linecard Y 314b.

Figure 3B:
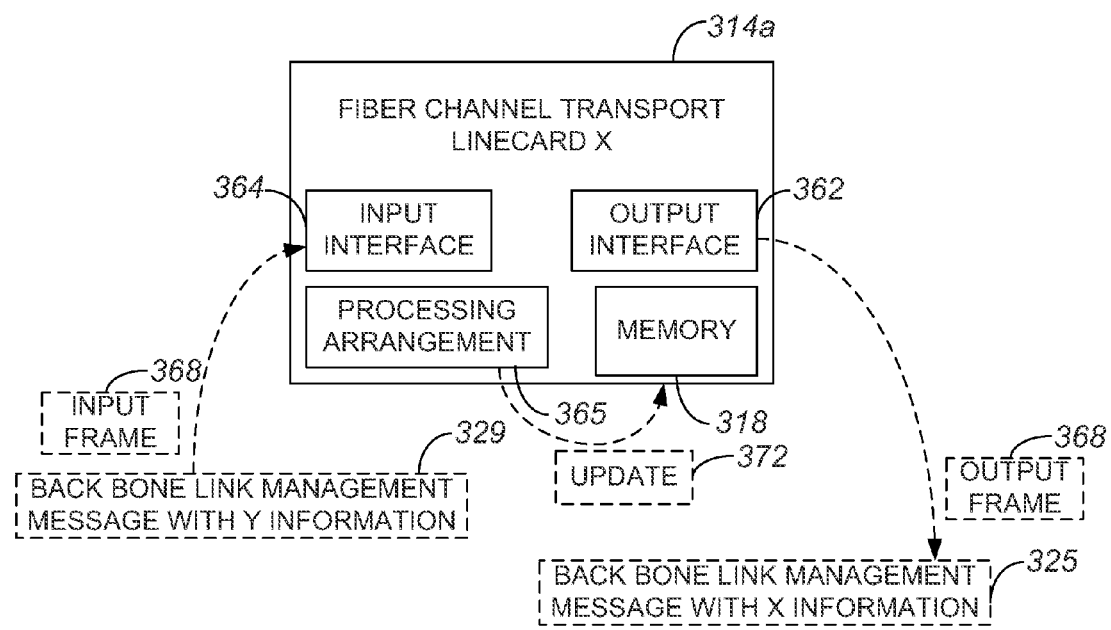
FIG. 3B is a diagrammatic representation of a fiber channel transport linecard, e.g., fiber channel transport linecard 314a of FIG. 3A, which receives, processes, and transmits BBLM messages in accordance with an embodiment of the present invention.

When fiber channel transport linecard X 314a receives a fiber channel frame and a BBLM message from fiber channel transport linecard Y 314b, fiber channel transport linecard X 314a processes the BBLM message. If there is a frame to be sent to fiber channel transport linecard Y 314b, fiber channel transport linecard X 314a sends the frame to fiber channel transport linecard Y 314b and also initiates a return BBLM message to fiber channel transport linecard Y 314b. FIG. 3B is a block diagram representation of fiber channel transport linecard X 314a that receives a frame and a BBLM message and outputs a frame and a BBLM message in accordance with an embodiment of the present invention. Fiber channel transport linecard X 314a includes an ingress or input interface 364 that is arranged to receive input from another fiber channel transport linecard, e.g., fiber channel transport linecard Y 314b of FIG. 3A. Input interface 364 may also be arranged to receive input from other devices such as a fiber channel node or switch.

As shown, fiber channel transport linecard X 314a receives an input frame 368 and BBLM message 329 from fiber channel transport linecard Y 314b on input interface 364. A processing arrangement 365 of fiber channel transport linecard X 314a processes frame 368 and BBLM message 329. Processing BBLM message 329 may include identifying the K character associated with BBLM message 329, i.e., the K character stored in a BBLM ordered set that includes BBLM message 329, and reading the information pertaining to fiber channel transport linecard Y 314b from BBLM message 329. Using the information, and update 372 may be made to a memory 318 of fiber channel transport linecard X 314a. Update 372 may cause memory 318 to update a credit indication associated with fiber channel transport linecard Y 314b. Processing arrangement 365 may also store input frame 368 into memory 318 if it is determined that fiber channel transport linecard X 314a is not capable of substantially immediately transmitting input frame 368 to a desired destination via an output interface 362.

An egress or output interface 362 is arranged to transmit an output frame 368 to fiber channel transport linecard Y 314b when output frame 368 is intended to be transmitted to a destination via fiber channel transport linecard Y 314b. Output frame 368 may be transmitted substantially immediately after being received on input interface 364, or output frame 368 may be transmitted after output frame 368 is first stored into a queue in memory 318. Output frame 368 is transmitted such that BBLM message 325, which contains information associated with fiber channel transport linecard X 314a, is transmitted along with a plurality of ordered sets or idle ordered sets that either precede or follow output frame 368.

Figure 3C:
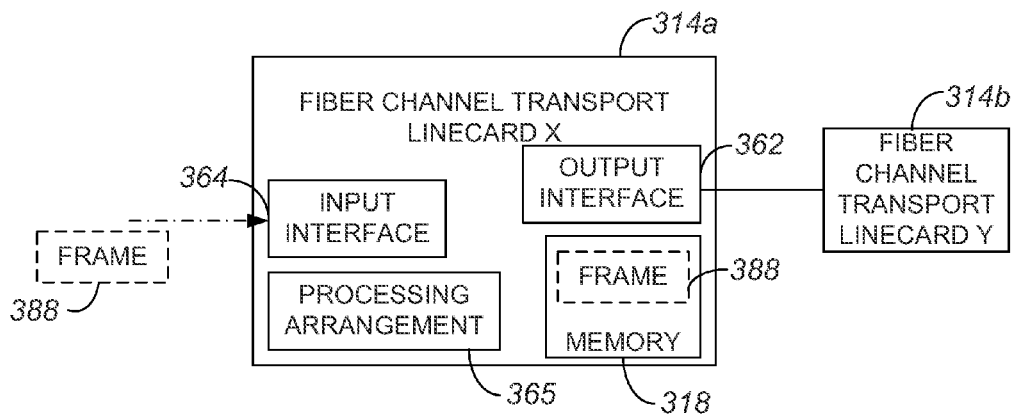
FIG. 3C is a diagrammatic representation of a fiber channel transport linecard, e.g., fiber channel transport linecard 314a of FIG. 3A, in which an input frame is stored until a destination for the frame is capable of receiving the frame in accordance with an embodiment of the present invention.

As mentioned above, a frame may be stored in memory prior to being transmitted or forwarded from output interface 362. FIG. 3C is a block diagram representation of fiber channel transport linecard X 314a of FIGS. 3A and 3B in which an input frame is stored until a destination for the frame is capable of receiving the frame in accordance with an embodiment of the present invention. A frame 388, which is intended to be sent to a fiber channel transport linecard Y 314 en route to an intended destination (not shown), is received from a source (not shown) on input interface 364. Processing arrangement 365 stores frame 388 into memory 318 if processing arrangement 365 determines that indications are that either fiber channel transport linecard Y 314b is unable to receive frame 388, or frame 388 is not next in a queue for transmission to fiber channel transport linecard Y 314b. Frame 388 remains in memory 318 until output interface 362 may transmit frame 388 to fiber channel transport linecard Y 314b.

Figure 3D:
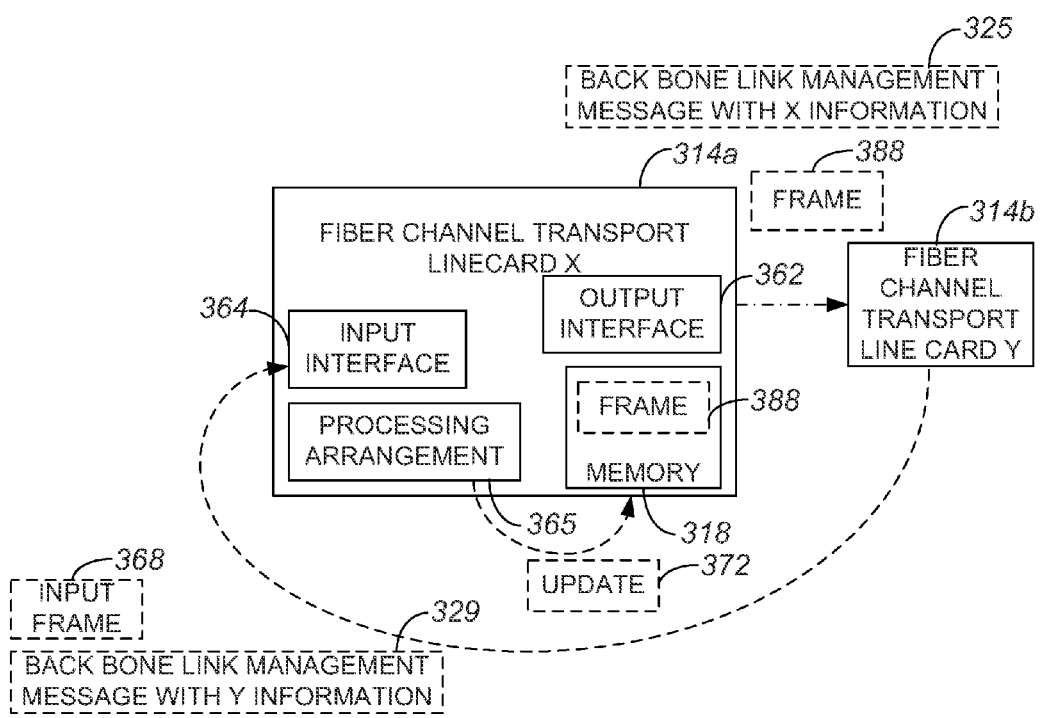
FIG. 3D is a diagrammatic representation of a fiber channel transport linecard, e.g., fiber channel transport linecard 314a of FIG. 3C, in which a stored frame is sent to a destination after information is received in a BBLM message which indicates that the destination is capable of receiving the frame in accordance with an embodiment of the present invention.

In the described embodiment, frame 388 is stored in memory 318 because fiber channel transport linecard Y 314b has insufficient credit to receive frame 388 and to subsequently transmit frame 388 to an intended destination (not shown). Hence, frame 388 remains in memory 318 until fiber channel transport linecard X 314a receives a BBLM message from fiber channel transport linecard Y 314b which indicates that fiber channel transport linecard Y 314b has sufficient credit to receive and to transmit frame 388. Referring next to FIG. 3D, a process of essentially freeing frame 388 from memory 318 will be described in accordance with an embodiment of the present invention. When input frame 368 and BBLM message 329 are received from fiber channel transport linecard Y 314b on input interface 364, processing arrangement 365 provides update 372 to memory 318 which indicates that fiber channel transport linecard Y 314b has sufficient credit to receive frame 388. Such an indication is communicated by BBLM message 329. Hence, one fiber channel transport linecard X 314a is aware that fiber channel transport linecard Y 314b is capable of receiving frame 388, frame 388 is sent via output interface 362. BBLM message 325 is transmitted with frame 388 or, more specifically, as a BBLM ordered set in a stream of ordered sets transmitted along with frame 388 to fiber channel transport linecard Y 314b.

Figure 4:
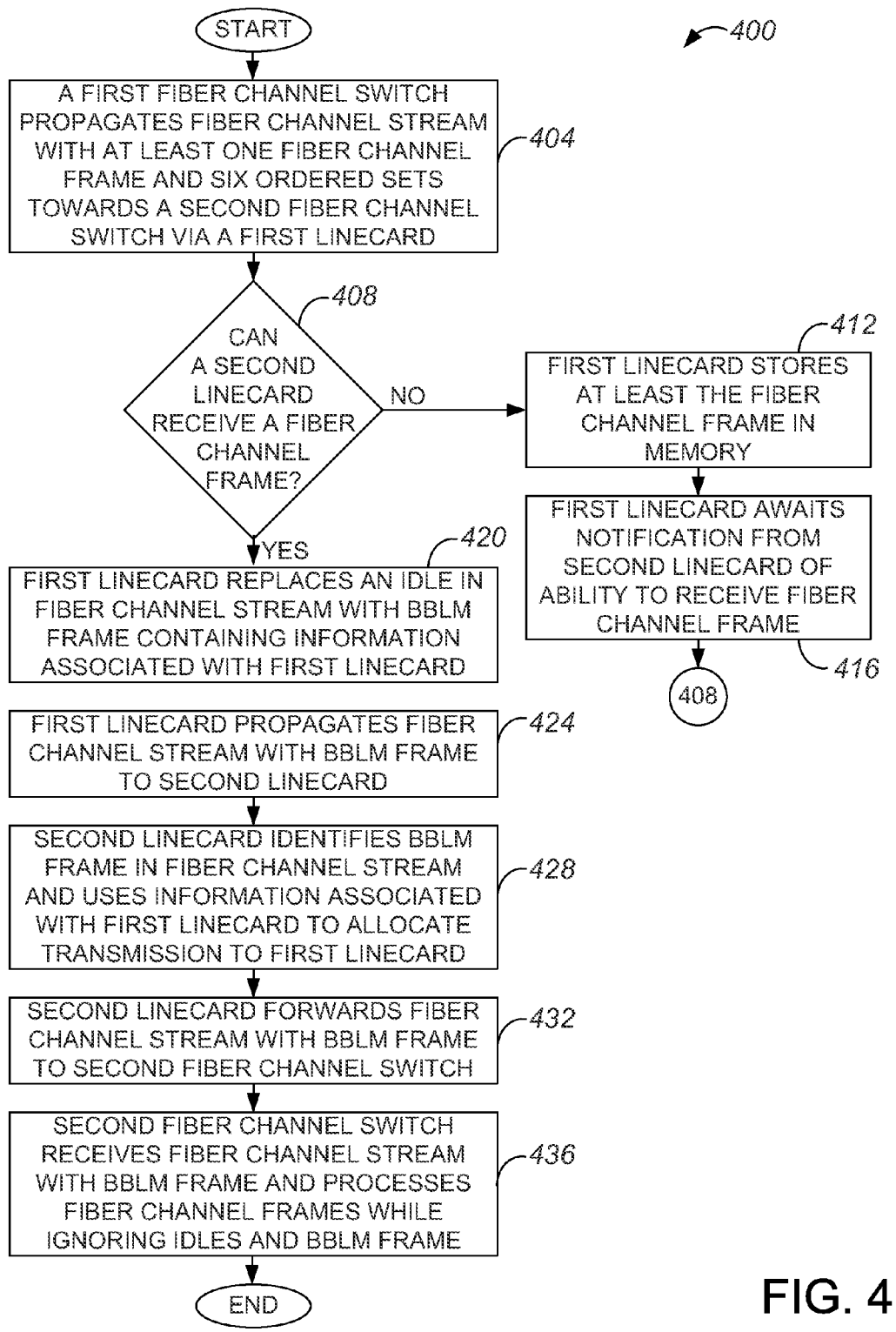
FIG. 4 is a process flow diagram which illustrates one method of sending a fiber channel frame from a first fiber channel switch to a second fiber channel switch through a plurality of intermediate fiber channel transport linecards in accordance with an embodiment of the present invention.

BBLM ordered sets may be sent between fiber channel transport linecards that are used between fiber channel switches or nodes to facilitate distance extension for fiber channel communications, as previously mentioned. Such BBLM ordered sets are typically sent from one fiber channel transport linecard to another along a path upon receiving a fiber channel frame that is intended to traverse the path. FIG. 4 is a process flow diagram which illustrates one method of sending a fiber channel frame from a first fiber channel node or switch to a second fiber channel node or switch through a plurality of intermediate fiber channel transport linecards in accordance with an embodiment of the present invention. A process 400 of sending a fiber channel frame along a path which utilizes distance extension begins at step 404 in which a first fiber channel switch propagates a fiber channel stream to a first linecard, e.g., a first fiber channel transport linecard. The fiber channel stream includes at least one fiber channel frame intended for transmission to a second fiber channel switch, as well as at least six ordered sets. As will be appreciated by those skilled in the art, the ordered sets typically include one receive-ready ordered set and a plurality of idle ordered sets.

A determination is made in step 408 as to whether a second linecard, e.g., a second fiber channel transport linecard, in a path between the first linecard and the second fiber channel switch is able to receive the fiber channel frame. Such a determination may include, but is not limited to, determining whether the second linecard has sufficient credit to receive and to subsequently transmit the fiber channel frame included in the fiber channel stream to the second fiber channel switch. If it is determined in step 408 that the second linecard is capable of receiving the fiber channel frame, process flow proceeds to step 420 in which the first linecard replaces an idle ordered set or idle in the fiber channel stream with a BBLM frame or ordered set that contains information associated with the first linecard. It should be appreciated that if fewer than all ordered sets included in the original fiber channel stream were received by the first linecard, the first linecard may also replace the missing ordered sets.

After the first linecard creates and places a BBLM frame or ordered set in the fiber channel stream intended for the second fiber channel switch, the first linecard propagates the fiber channel stream with the BBLM frame to the second linecard in step 424. The second linecard identifies the BBLM frame in the fiber channel stream, e.g., by identifying the K character in the BBLM frame, and uses the information stored in a BBLM message of the BBLM frame to allocate transmission to the first line card in step 428. In other words, suing information in the BBLM frame, the second linecard effectively updates link control information that is associated with transmissions from the second linecard to the first linecard.

Once the transmission to the first linecard is allocated by the second linecard, the second linecard forwards the fiber channel stream with the BBLM frame to the second fiber channel switch in step 432. If there is a queue of frames awaiting transmission to the second fiber channel switch, the fiber channel stream may be delayed before being transmitted to the second fiber channel switch. That is, at least the fiber channel frame that is intended for the second fiber channel switch may be stored in a memory of the second linecard before being transmitted as a part of a fiber channel stream to the second fiber channel switch. Although the BBLM frame may be transmitted to the second fiber channel switch, it should be appreciated that the BBLM frame may be replaced by a standard ordered set such as an idle before being transmitted to the second fiber channel switch.

In step 436, the second fiber channel switch receives the fiber channel stream with the BBLM frame, and processes the fiber channel frame or frames included in the fiber channel frame. Processing the fiber channel frame or frames generally includes ignoring any ordered sets received with the fiber channel stream. After the second fiber channel switch receives the fiber channel stream, the process of sending a fiber channel frame along a path is completed.

Returning to step 408, if the determination is that the second linecard is not capable of receiving a fiber channel frame, the indication is that the memory or buffer associated with the second linecard is substantially full. In other words, if the second linecard may not receive a fiber channel frame, the second linecard has insufficient credit to receive and to forward a fiber channel frame. Accordingly, process flow moves to step 412 in which the first linecard stores at least the fiber channel frame of the fiber channel stream in memory. After the fiber channel frame of the fiber channel stream is stored in memory, the first linecard awaits notification from the second line card of an ability to receive the fiber channel frame in step 416, e.g., notification in a BBLM message. From step 416, process flow returns to step 408 in which it is determined if the second linecard is capable of receiving the fiber channel frame.

Figure 5:
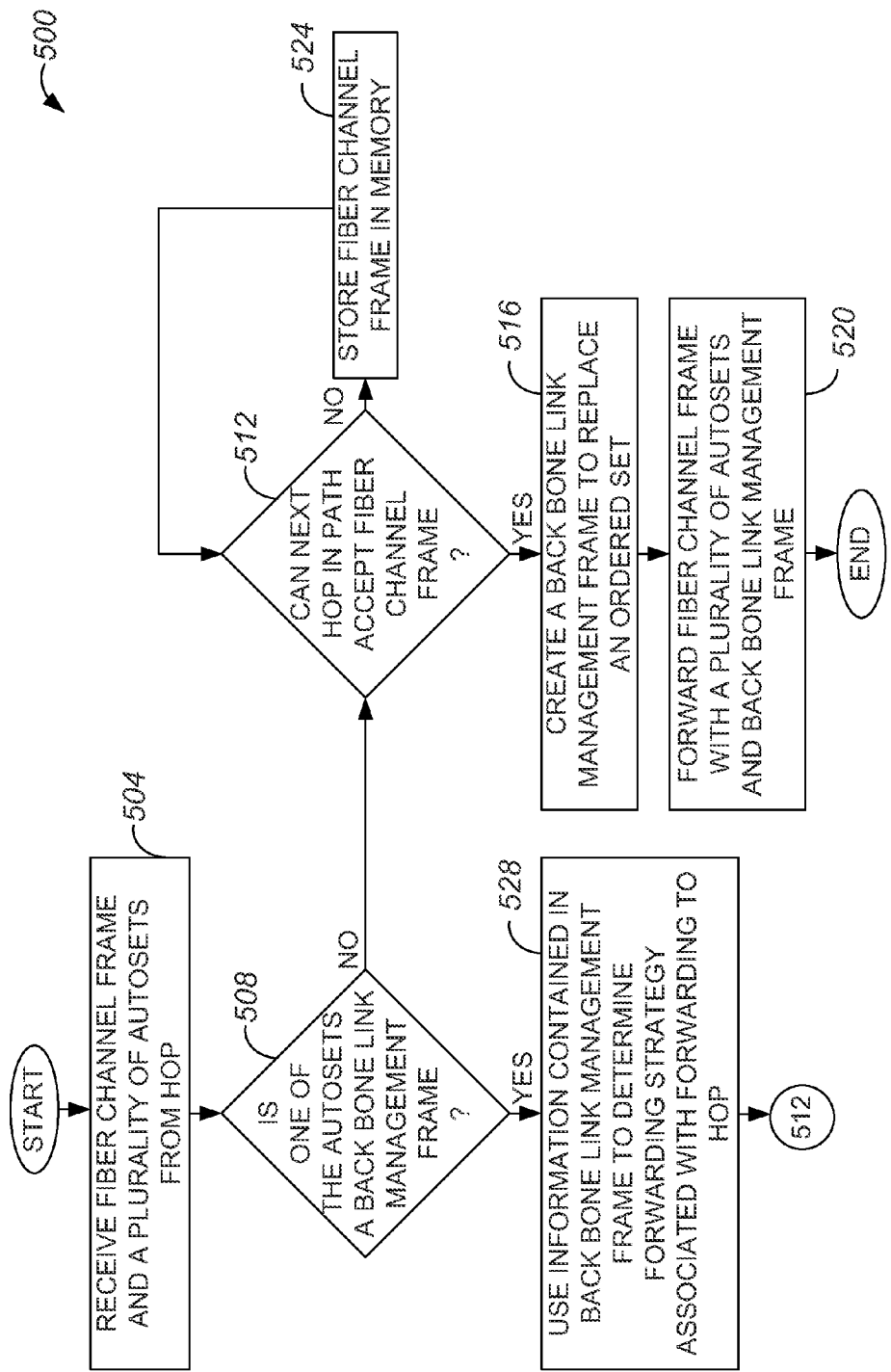
FIG. 5 is a process flow diagram which illustrates one method of processing a fiber channel stream received on a fiber channel transport linecard with the capability of utilizing BBLM frames in accordance with an embodiment of the present invention.

FIG. 5 is a process flow diagram which illustrates one method of processing a fiber channel stream received on a fiber channel linecard with the capability of utilizing BBLM frames in accordance with an embodiment of the present invention. A method 500 of processing a fiber channel stream begins at step 504 in which a fiber channel linecard receives a fiber channel frame and a plurality of ordered sets from a hop in a path that also includes the fiber channel linecard. It should be appreciated that the fiber channel linecard only receives the fiber channel frame if the fiber channel linecard has the capacity to do so. A determination is made in step 508 as to whether one of the ordered sets is a BBLM frame or ordered set. Such a determination may be made by identifying the K character associated one of the ordered sets. In one embodiment, if one of the ordered sets has a K character that is a K26.5 character, then that ordered set is a BBLM frame.

If the determination in step 508 is that at least one of the ordered sets is a BBLM frame, then the information contained in the BBLM frame is used to determine a forwarding strategy associated with the hop from which the BBLM frame was received in step 528. In one embodiment, using the information to determine a forwarding strategy includes determining whether the information indicates that the fiber channel transport linecard from which the BBLM frame was received, i.e., a hop in a path, is currently capable of accepting a fiber channel frame. Information contained in the fiber channel transport linecard that received the BBLM frame may be updated to indicate a number of credits associated with the hop in the path from which the BBLM frame was received.

From step 528, process flow proceeds to step 512 in which it is determined if the next hop in the path is capable of receiving a fiber channel frame. It should be appreciated that the next hop in the path is the hop to which the fiber channel frame received in step 504 is to be forwarded. If it is determined that the next hop in the path is not capable of receiving a fiber channel frame, the fiber channel frame is stored in the memory in step 524, and process flow returns to step 512 in which it is determined if the next hop is capable of accepting the fiber channel frame.

Alternatively, if it is determined in step 512 that the next hop in the path is capable of receiving the fiber channel frame, a BBLM frame is created in step 516 to replace an ordered set transmitted with the fiber channel frame in step 504. It should be appreciated that ordered sets may either be reused or created anew when a BBLM frame is created. After the BBLM frame is created to be transmitted in place of an ordered set in step 516, the fiber channel frame is forwarded in step 520 with a plurality of ordered sets and a BBLM frame in step 520. In general, the fiber channel frame is forwarded with at least five ordered sets and the BBLM frame, although any number of ordered sets and BBLM frames may be forwarded along with the fiber channel frame. Once the fiber channel frame is forwarded, the processing of a fiber channel frame by a fiber channel linecard with the capability of utilizing BBLM frames is completed.

Returning to step 508, if it is determined that at least one of the ordered sets received with the fiber channel frame is not a BBLM frame, then process flow proceeds directly to step 512 in which it is determined if the next hop in the path is capable of accepting the fiber channel frame. In the described embodiment, if none of the ordered sets received with the fiber channel frame is a BBLM frame, the indication is that the fiber channel frame is received from a fiber channel switch and is to be forwarded by the fiber channel transport linecard to another fiber channel transport linecard.

When a transport node such as a fiber channel transport linecard sends or receives a fiber channel frame, the transport node makes an adjustment to the number of credits associated with the transport node. By way of example, when a fiber channel frame is received by a fiber channel linecard, the fiber channel transport linecard may reduce the number of credits associated therewith, as more storage capacity of the fiber channel transport linecard is in use. Alternatively, when a fiber channel frame is sent or forwarded by the fiber channel transport linecard, the number of credits associated with the fiber channel transport linecard is increased to indicate that storage space has become available.

Figure 6:
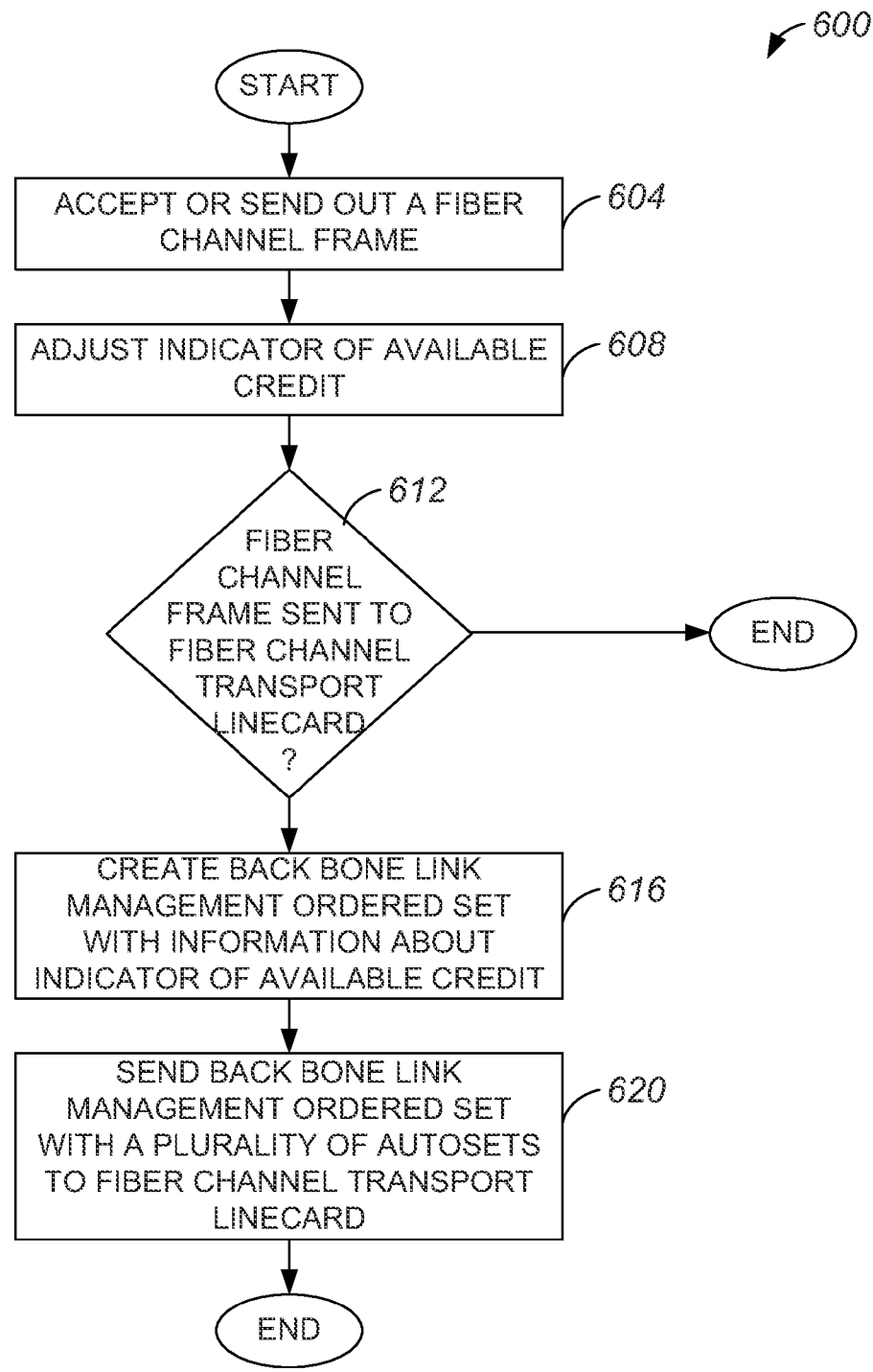
FIG. 6 is a process flow diagram which illustrates one method of updating credit information associated with a fiber channel transport linecard and providing the updated credit information to another fiber channel transport linecard in accordance with an embodiment of the present invention.

With reference to FIG. 6, a method of updating a number of credits associated with a fiber channel transport linecard and providing the updated information to another fiber channel transport linecard will be described in accordance with an embodiment of the present invention. A method 600 of processing information pertaining to credits associated with a fiber channel transport linecard begins at step 604 in which the fiber channel transport linecard either receives a fiber channel frame that is to be stored into a buffer or sends a fiber channel frame that was queued in the buffer. Once the fiber channel transport linecard receives or sends a fiber channel frame, an indicator of available credit is adjusted in step 608. That is, an amount of credit that is arranged to indicate how many fiber channel frames the fiber channel transport linecard is currently capable of receiving is updated. Updating the indicator of available credit may include storing the indicator into a memory of the fiber channel transport linecard.

A determination is made in step 612 as to whether a fiber channel frame was sent in step 604 to another fiber channel transport linecard, i.e., another fiber channel transport linecard that is capable of processing a BBLM message. In other words, if a fiber channel frame was sent and not received in step 604, it is determined if the fiber channel frame was forwarded to another fiber channel transport linecard. If the determination is that a fiber channel frame was not sent to another fiber channel transport linecard, the processing of information pertaining to credits is completed.

If, however, it is determined in step 612 that a fiber channel frame was set to another fiber channel transport linecard, process flow moves to step 616 in which a BBLM ordered set that includes the indicator of available credit, or information associated with the indicator. The BBLM ordered set is then sent in step 620, along with a plurality of ordered sets, to the same fiber channel transport linecard to which the fiber channel frame was sent. After the BBLM ordered set is sent, the processing of information pertaining to credits is completed.

Although only a few embodiments of the present invention have been described, it should be understood that the present invention may be embodied in many other specific forms without departing from the spirit or the scope of the present invention. By way of example, a single ordered set has been described as being replaced by a BBLM ordered set. While a single ordered set is generally replaced by a BBLM ordered set, any number of ordered sets may generally be replaced by a BBLM ordered set.

A BBLM ordered set has been described as being inserted into an ordered set or idle ordered set stream when a fiber channel frame is to be transmitted. That is, a BBLM ordered set is generally transmitted when a fiber channel frame is to be transmitted. However, a BBLM ordered set is not limited to be transmitted when a fiber channel frame is to be transmitted. For instance, a BBLM ordered set may be transmitted when there is a relatively long period of idle time during which effectively no fiber channel frames are transmitted.

While a negative running disparity has been described as being included in a BBLM ordered set, or a BBLM ordered set that replaces an ordered set or an idle ordered set, it should be understood that a running disparity is not necessarily included with header error control bits in a BBLM ordered sets. For example, a negative running disparity may not be needed if fiber channel is mapped into SONET or Synchronous digital hierarchy (SDH). Hence, a BBLM ordered set may not necessarily include a negative running disparity.

Transport nodes have generally been described as being fiber channel transport linecards, although transport nodes are not limited to being fiber channel transport linecards. By way of example, transport nodes may be substantially any nodes or network elements which include memories and may be used to buffer frames that are to be sent from one fiber channel switch to another.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method for operating a first transport node to provide fiber channel communications between a first fiber channel switch and a second fiber channel switch, wherein a path between the first fiber channel switch and the second fiber channel switch includes at least the first transport node and a second transport node, the method comprising:
   creating a fiber channel stream, the fiber channel stream including at least a first fiber channel frame, wherein the fiber channel stream is arranged to include a plurality of ordered sets;
   creating a back bone link management (BBLM) ordered set, the BBLM ordered set including information that indicates an ability for the first fiber channel switch to receive a second fiber channel frame from the second transport node;
   inserting the BBLM ordered set into the fiber channel stream in place of a first ordered set of the plurality of ordered sets; and
   sending the fiber channel stream to the second transport node.

2. The method of claim 1 wherein creating the BBLM ordered set comprises inserting a K character into the BBLM ordered set.

3. The method of claim 2 wherein the K character is a K26.5 character.

4. The method of claim 1 wherein the BBLM ordered set comprises approximately 32 bits, the approximately 32 bits including at least one head error control bit.

5. A first transport node, the first transport node arranged to be positioned in a path between a first fiber channel switch and a second fiber channel switch, the path including at least one other transport node, the first transport node comprising:
- means for creating a fiber channel stream, the fiber channel stream including at least a first fiber channel frame, wherein the fiber channel stream is arranged to include a plurality of autosets;
- means for creating a back bone link management (BBLM) ordered set, the BBLM ordered set including information that indicates an ability for the first fiber channel switch to receive a second fiber channel frame from the second transport node;
- means for inserting the BBLM ordered set into the fiber channel stream in place of a first ordered set of the plurality of ordered sets; and
- means for sending the fiber channel stream to the second transport node.

* * * * *